Patented Aug. 17, 1954

2,686,782

UNITED STATES PATENT OFFICE 2,686,782

METHOD OF PRODUCING TRIPHOSPHORIC ACID ESTERS OF HYDROXYTHIAMINE AND COMPOUNDS OBTAINED THEREBY

Jaroslav Bartos, Paris, France, assignor to Usines Chimiques des Laboratoires Français, Paris, France, a body corporate of France No Drawing. Application November 14, 1950, Serial No. 195,706

Claims priority, application France November 18, 1949

6 Claims. (Cl. 260—256.5)

The present invention relates to a new method of producing triphosphoric acid esters of thiamine (vitamin $B_1$) and its derivatives, and to new products obtained thereby, and more particularly to the triphosphoric acid esters of hydroxy thiamine and its derivatives and to the intermediate reaction product of the same, the phosphate of hydroxy thiamine and its derivatives.

One object of this invention is to provide a process for producing triphosphoric acid esters of thiamine, hydroxy thiamine and their derivatives, whereby a high yield and very pure compounds are obtained.

Another object of this invention consists in providing new and useful triphosphoric esters of hydroxy thiamine and its derivatives, said esters possessing a higher physiological activity than the corresponding esters of thiamine itself.

Other objects of this invention will be apparent from the specification and the examples given thereinafter.

The process of this invention consists in principle in reacting the dipicrates of thiamine, hydroxy thiamine, or their derivatives with phosphorylating agents, such as orthophosphoric acid whereby the phosphoric acid salts of thiamine, hydroxy thiamine, or their derivatives are formed. Said phosphates are then reacted with phosphorus pentoxide at elevated temperature thereby yielding the triphosphoric acid esters of said compounds.

The starting materials, the dipicrates, are obtained by reacting other salts of the bases, for instance, the chloride-hydrochloride, with picric acid.

The reaction may be illustrated by the following formulas:

The new triphosphoric acid ester of hydroxy thiamine contains three phosphorus atoms and, therefore three phosphoric acid residues of which only two are split off by acid hydrolysis, thereby forming phosphoric acid. Prior to said hydrolysis practically no phosphoric acid ions are found in the aqueous solution of said compound. An analysis of its phosphorus content yields the following result:

|  | Calculated for $C_{12}H_{18}O_{11}N_3SP_3$ | Found |
|---|---|---|
|  | Percent | Percent |
| Ionizable phosphorus | 0.0 | 0.7 |
| Phosphorus split off by acid hydrolysis | 12.3 | 12.6 |
| Total phosphorus | 18.4 | 18.2 |

The following examples serve to illustrate the invention without however, limiting the same to them.

EXAMPLE 1

*a. Production of the phosphate of hydroxy thiamine of the above given Formula II*

100 g. of the chloride-hydrochloride of hydroxy thiamine (Formula I) are dissolved in 1150 cc. of about 85% ethyl alcohol. While heating the solution under reflux, 140 g. of picric acid are added and the reaction mixture is allowed to boil until the picric acid is completely dissolved. On cooling, the dipicrate of the hydroxy thiamine crystallizes. Yield: 90%. Melting point 120–121° C.

100 g. of said dipicrate are triturated at room temperature with 100 cc. of 80% orthophosphoric acid. After eliminating the excess acid by cen-

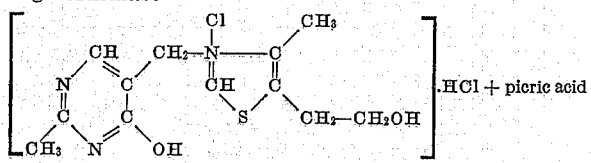
Hydroxy thiamine-chloride-hydrochloride (I) .HCl + picric acid ⟶ dipicrate of hydroxy thiamine + orthophosphoric acid ⟶

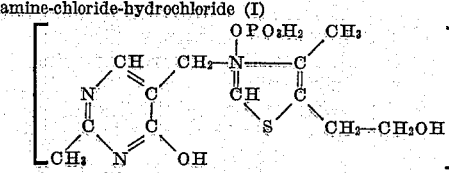
Phosphate of hydroxy thiamine (II) .PO₄H₃ + phosphoric acid anhydride ⟶

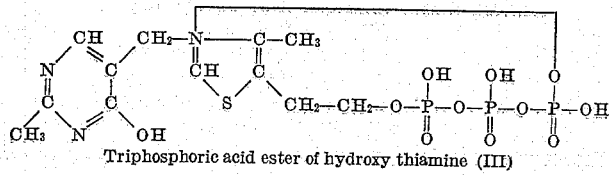
Triphosphoric acid ester of hydroxy thiamine (III)

trifuging, the residue is treated at room temperature successively first with 50 cc. of 80% orthophosphoric acid, then with 100 cc. of 50% orthophosphoric acid, and thereafter with 100 cc. of water. The combined filtrates are decolorized by means of charcoal and are poured into 10 liters of acetone in order to precipitate the phosphate of above Formula II which separates in the form of an oil. By treating said oil with boiling absolute alcohol followed by cooling to 0° C., the salt is obtained in crystalline form. Yield: 80%. Melting point (with decomposition): 127–129° C.

*Analysis.*—$C_{12}H_{21}O_{10}N_3SP_2$: mol. weight 461.4.

|  | Calculated | Found |
| --- | --- | --- |
|  | Percent | Percent |
| Nitrogen | 9.1 | 9.3 |
| Phosphorus | 13.4 | 13.5 | b. *Production of the triphosphoric acid ester of hydroxy thiamine of the above given Formula III*

100 g. of the phosphate of hydroxy thiamine of Formula II are heated until melted in a wide-neck flask and 48 g. of phosphoric acid anhydride are added, whereafter the temperature is increased to 145° C., with continuous stirring. After 30 minutes, the mixture is allowed to cool. The vitreous mass obtained is dissolved in 500 cc. of water. An oil is precipitated from the filtered aqueous solution by the addition of 2500 cc. of acetone. After allowing the mixture to stand overnight, the oil is decanted and is again dissolved in 250 cc. of water, the solution is treated with decolorizing charcoal, filtered, and the oil is reprecipitated by the addition of 1600 cc. of acetone. After allowing the mixture to stand overnight, the oil is again dissolved in 500 cc. of water, treated with decolorizing charcoal, filtered, and reprecipitated by means of 3200 cc. of acetone. All these dissolving, filtering, and precipitating operations are carried out at about 0° C. After allowing the oil to stand overnight, it is washed with 200 cc. of acetone and is then covered with 1500 cc. of a mixture of 50% of absolute alcohol and 50% of acetone. On allowing the washed oil to stand in a refrigerator, the product of above Formula III crystallizes. Crystallization is achieved by trituration. The crystalline mass is then treated as usual, i. e., it is centrifuged, washed, and dried. The product obtained represents a light yellow, microcrystalline powder. Yield: 50%. Melting point: About 215° C. It is soluble in water, but insoluble in organic solvents. The new triphosphoric acid ester of hydroxy thiamine is considerably more active than the triphosphoric acid ester of thiamine.

The starting material, the hydroxy thiamine, is obtained as dichlorohydrate by desamination of thiamine by means of nitrous acid. Compare for instance, Soodak and Cerecedo, Journal American Chemical Society 1944, vol. 66, p. 1988.

EXAMPLE 2

The triphosphoric acid ester of the thiamine is produced in a similar manner, as described in Example 1, by using 100 grams of the dichlorohydrate of thiamine as starting material.

Of course, many changes and variations may be made by those skilled in the art in the reaction conditions, the solvents used, the precipitating agents employed, the reaction temperature and duration, the concentration of the phosphoric acid, the manner of purifying and crystallizing the crude reaction products and the like, in accordance with the principles set forth herein and in the claims annexed hereto.

What I claim is:

1. A triphosphoric acid ester of hydroxy thiamine of the general formula $C_{12}H_{18}O_{11}N_3SP_3$ and of the following structural formula

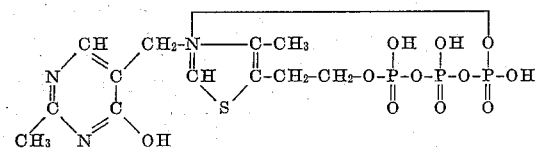

said ester melting at about 215° C., being soluble in water, but insoluble in acetone and having a physiological activity corresponding to, but higher than that of co-carboxylase and the triphosphoric acid ester of thiamine.

2. In a method of producing triphosphoric acid esters of thiamine and hydroxy thiamine, the steps comprising reacting a dipicrate of a compound selected from the group of compounds consisting of thiamine and hydroxy thiamine, with ortho phosphoric acid, treating the resulting phosphate with phosphoric acid anhydride, and isolating the triphosphoric acid ester formed from the reaction mixture.

3. In a method of producing triphosphoric acid esters of thiamine and hydroxy thiamine, the steps comprising reacting a dipicrate of a compound selected from the group consisting of thiamine and hydroxy thiamine, with ortho phosphoric acid, treating the resulting phosphate with phosphoric acid anhydride, dissolving the reaction mixture in water, and adding acetone to the resulting aqueous solution to precipitate said triphosphoric acid esters.

4. In a method of producing triphosphoric acid esters of thiamine and hydroxy thiamine, the steps comprising reacting a dipicrate of a compound selected from the group consisting of thiamine and hydroxy thiamine, with ortho phosphoric acid, treating the resulting phosphate with phosphoric acid anhydride at a temperature above the melting point of said phosphate, and isolating the triphosphoric acid ester formed from the reaction mixture.

5. In a method of producing triphosphoric acid esters of thiamine and hydroxy thiamine, the steps comprising reacting a dipicrate of a compound selected from the group consisting of thiamine and hydroxy thiamine, with ortho phosphoric acid, treating the resulting phosphate with phosphoric acid anhydride at about 145° C., and isolating the triphosphoric acid ester formed from the reaction mixture.

6. In a method of producing triphosphoric acid esters of thiamine and hydroxy thiamine, the steps comprising reacting a dipicrate of a compound selected from the group consisting of thiamine and hydroxy thiamine, with ortho phosphoric acid, treating the resulting phosphate with phosphoric acid anhydride, dissolving the reaction mixture in water, adding an organic solvent to the resulting aqueous solution to precipitate the triphosphoric ester formed, repeating said dissolving and precipitating steps to precipitate the substantially pure triphosphoric acid ester.

References Cited in the file of this patent

UNITED STATES PATENTS

| Number | Name | Date |
| --- | --- | --- |
| 2,328,594 | Williams et al. | Sept. 7, 1943 |

OTHER REFERENCES

Soodak et al.: J. Am. Chem. Soc. 66, 1988–1989 (1944).